C. H. GILL.
MOTION PICTURE TAPE WINDING MECHANISM.
APPLICATION FILED DEC. 29, 1920.
1,414,941.
Patented May 2, 1922.
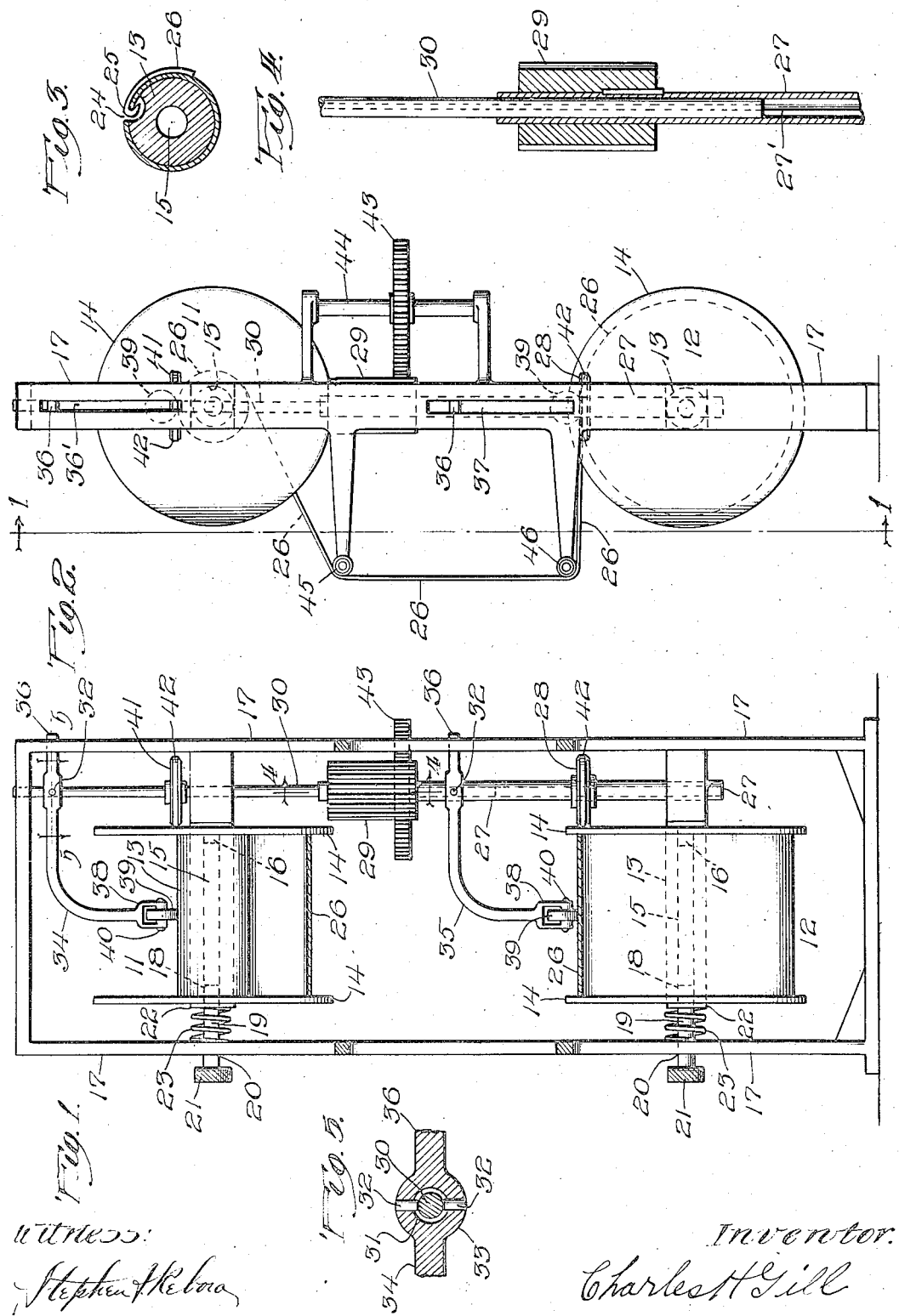
Inventor.
Charles H Gill

UNITED STATES PATENT OFFICE.

CHARLES H. GILL, OF CHICAGO, ILLINOIS, ASSIGNOR TO PAUL B. MALEBRANCHE, OF CHICAGO, ILLINOIS.

MOTION-PICTURE TAPE-WINDING MECHANISM.

1,414,941.  Specification of Letters Patent.  Patented May 2, 1922.

Application filed December 29, 1920. Serial No. 433,929.

*To all whom it may concern:*

Be it known that I, CHARLES H. GILL, a citizen of the United States, and resident of Chicago, in the county of Cook and State of Illinois, have invented a new and useful Motion-Picture Tape-Winding Mechanism, of which the following is a specification.

My invention relates to motion picture apparatus in which a tape or film is wound from one spool or reel through the camera or projecting machine and then upon another spool or reel and the objects of my invention are, first, to provide a film or tape winding mechanism that will operate accurately without the necessity of having the tape or film perforated for engagement with sprockets, as now generally done; second, to provide mechanism that will always unwind the same length of tape or film from the supply spool and wind the same length of tape upon the receiving spool in the same time, thus maintaining an even tension of the tape and making the operation of the receiving spool as positive as that of the supply spool; third, to provide mechanism whereby similar lengths of tape or film are wound from one spool and upon the other spool at each operative impulse irrespective of the constantly changing diameters of the spools and material wound thereon; fourth, to provide means for keeping that part of the tape or film that is being photographed upon or projected from in a given position irrespective of the constantly changing angles of the balance of the tape or film between the spools; fifth, to provide means for readily removing, replacing or changing the relative positions of the spools; and, sixth, to provide means for automatically adjusting the mechanism to differing lengths of tape or film that may be wound upon the supply spool at the beginning of the operation.

I accomplish these objects by means of the mechanism illustrated in the accompanying drawings, in which—

Figure 1 is a front elevation of my device, showing a film or tape wound largely upon the lower, or supply, spool but partly upon the upper, or receiving, spool and with the film or tape broken away between the spools to facilitate illustration of the parts; Figure 2 is a side elevation of the same but with the film or tape unbroken; Figure 3 is a detail view in section of the core of one of the spools, illustrating the means of attaching the end of the tape or film and of attaining a smooth roundness of the spool contents; Figure 4 is an enlarged detail view in section and taken on the line 4—4 of Figure 1; and Figure 5 is an enlarged detail view in section, taken on the line 5—5 of Figure 1.

Similar numerals refer to similar parts throughout the several views.

The spools 11 and 12 consist of cores 13 and circular retaining disks 14 fixed upon the cores 13 at or near each end of each core. The cores 13 are provided with cylindrical holes 15 running longitudinally through their centers and adapted to receive the nubs 16 which project from the frame 17 and supply bearings for one end of each of the spools. The other ends of the two spools are rotatably supported by the ends 18 of the pins 19, which ends 18 normally project slightly into the holes 15 in the cores 13. The pins 19 pass through openings 20 in the frame 17 and are supplied with milled heads 21 on their ends opposite to the ends 18 and with disks or collars 22 fixed upon the pins 19 near the ends 18. Spiral springs 23 surround the pins 19 between the frame 17 and the collars 22 and their compression normally forces the ends 18 into the holes 15 and also urges the spools 11 and 12 in the opposite direction toward the nubs 16. By pulling out on the milled heads 21 the springs 23 are further compressed and the ends 18 are withdrawn from the holes 15, allowing the spools 11 and 12 to be removed from the frame 17.

The cores 13 are not perfectly cylindrical. They are provided with slots 24 in which hooks 25 attached to the ends of the tape or film 26 may be caught at the beginning of winding. The diameters of the cores 13 are less by the thickness of the film or tape to be wound at the edge of the slots 24 in the winding direction than at the other edges of the slots and the increase in diameter is progressive around the cores to the edge of the slots 24 opposite to the winding direction. Thus, abrupt doubling of the thickness and consequent unevenness in winding are avoided.

A shaft 27 is slidably and rotatably journaled in the frame 17 and has secured to it near its lower end a friction wheel 28 against which one of the disks 14 of the spool 12 is pressed by one of the springs 23. The shaft 27 is provided with a cylindrical opening 27' in its upper end and extending through its center for some distance longitudinally of said shaft. This opening 27' is provided with a keyway or channel extending longitudinally thereof. The shaft 27 has a wide faced pinion 29 fixed upon it. Another shaft 30 of smaller diameter than the shaft 27 is provided with a key or feather and telescopes partly within the opening 27' in the shaft 27, its key or feather engaging the keyway or channel in the opening 27' and locking the shafts 27 and 30 together for rotation while permitting free longitudinal sliding movement to the shaft 30.

The shafts 27 and 30 are each provided with an annular groove 31 and pins 32 project from each side of a collar portion 33 of arms 34 and 35 and these pins 32 enter the annular grooves 31 and prevent the arms 34 and 35 from longitudinal movement upon the shafts 27 and 30 respectively. Portions 36 of the arms 34 and 35 extend through guide slots 36 and 37 in the frame 17 and prevent the arms 34 and 35 from rotating with the shafts 27 and 30 while permitting the said arms to accompany the said shafts in all longitudinal movements of the said shafts 27 and 30. The main parts of the arms 34 and 35 are bent at an angle of forty-five degrees and terminate in forks 38 within which rollers 39 are rotatably mounted by means of pins 40 and these rollers 39 are adapted to rest upon the material wound upon the spools and, through the arms 34 and 35, to move the shafts 27 and 30 in longitudinal directions so as to keep the driving surfaces of the friction wheels carried by said shafts even with the topmost layer of material upon each of the spools.

The shaft 30 has secured to it a friction wheel 41 which is adapted to engage frictionally the adjacent disk 14 of the spool 11, which disk is pressed against the friction wheel 41 by the spring 23 at the opposite side of the spool 11.

The friction wheels 28 and 41 are of like construction and of like diameter. Each is provided with an annular groove in its periphery and these grooves are adapted to receive bands of rubber or other frictional material 42 to constitute a friction driving surface for each of the friction wheels.

A gear wheel 43 is rotatably mounted upon a shaft 44 fixed in the frame 17 and engages with the wide pinion 29 to drive the described mechanism, and this gear wheel 43 is adapted to be connected to and driven by a source of rotary motion.

Rollers 45 and 46 are journaled in the frame 17 to act as guides for the tape or film 26 in its passage from one of the spools to the other spool.

In preparing this for use, the lower spool 12 is removed from the frame 17 by pulling outwardly upon the milled head 21 of the pin 19 against the resistance of the spiral spring 23, thus withdrawing the end 18 of that pin from the hole 15 in the core 13 of the spool 12 and allowing the spool 12 to be moved sidewise sufficiently to disengage the nub 16 from the hole 15. This spool is now wound with the tape or film to be photographed upon or to be exhibited from and replaced within the frame 17, or another similarly constructed spool having the tape or film already wound thereon is substituted and placed in position in the frame 17.

In introducing the spool 12 into the frame 17 the arm 35 is raised upwardly, causing the shaft 27 to slide upwardly with it. The arm 35 is released when the spool 12 is in position and will then fall by gravity until the roller 39 contacts with and rests upon the material or film 26 carried by that spool. Since the driving surface of the friction wheel 28 is exactly even with the bottom of the roller 39, this will insure the friction wheel 28 engaging the disk 14 at a point even with the outer convolution of the tape or film 26 carried by the spool 12.

The outer end of the tape or film 26 is now carried upward and around the rollers 46 and 45 and the hook 25 with which the tape or film terminates is caught in the slot 24 in the core 13 of the upper spool 11. The roller 39 which terminates the arm 34 rests upon the core 13 of the spool 11 and, consequently, the friction wheel 41 bears against the disk 14 of the spool 11 at a point even with the outer surface of the core 13.

Now, when rotary motion is communicated to the shafts 27 and 30, through the gear wheel 43 and the wide pinion 29, the friction wheels 41 and 28 will each rotate the respective spools with which they are frictionally engaged and each will rotate its respective spool at a rate of speed inversely proportional to the distance from the center of rotation of the spool the respective friction wheel may be. This will be true whether the rotary motion imparted through the gear wheel 43 is continuous or consists of intermittent impulses. When of the latter, as would normally be the case in motion picture apparatus, the quantity of tape or film unwound from the supply spool at each rotary impulse would be exactly the same as that wound upon the receiving spool and the same exact length of tape or film will pass between the rollers 45 and 46 at each rotary impulse. Thus, this intermittent rotary impulse can be regulated to be such that a length of tape or film equivalent to the height of a single photograph will be moved between the rollers 45 and 46 at each intermittent rotary impulse, despite the constantly changing diameters of the material wound upon the two spools. Since the length unwound from one spool is exactly the same as that wound upon the other spool, it will be seen that an unvarying tension may be maintained in the tape or film between spools. It will also be evident that there is no advantage in or need of using perforated tape or film with this mechanism.

Having described my invention, I claim:

1. In a tape winding mechanism, the combination of a supply spool, a receiving spool, friction disks carried by each of said spools respectively, friction wheel rotatable in unison and adapted to rotate each of said spools respectively through frictional engagement with said friction disks, and means controlled by the quantities of material carried by each of said spools respectively for causing the said friction wheels to rotate the said spools at such speeds relative to each other as to unwind equal lengths of material from the said supply spool at each rotation of the said friction wheels and to wind upon the said receiving spool at each rotation of the said friction wheels lengths of material equal to the lengths unwound from the said supply spool during the same rotation of the said friction wheels.

2. In tape winding mechanism, the combination of two spools adapted to carry flexible material wound thereon, flanges carried by each of said spools, two friction members adapted to simultaneously impart rotary motion directly to each of said flanges respectively, a member adapted to rotate both of the said two friction members in unison with each other, and automatic means controlled by the quantities of flexible material wound upon each of said spools respectively for regulating the degrees of rotary motion imparted to each of the said spools respectively through the said flanges by a given degree of movement of the said friction wheels.

3. In tape winding mechanism, the combination of two spools provided with friction surfaces, two friction members driven in unison with each other and engaging frictionally the said friction surfaces of each of the said spools respectively, and automatically operating means for so varying the points of frictional engagement of the said friction members with the said friction surfaces relative to the axes of the said spools as to cause the said friction members to rotate each of the said spools respectively in like times through numbers of degrees inversely proportional to the quantities of material wound upon each of said spools respectively.

4. In tape winding mechanism, the combintaion of two spools, flexible material adapted to be wound from one of said spools to the other of said spools, transmission elements operating independently of said flexible material for rotating each of said spools, and means controlled by the quantities of said flexible material carried by each of said spools respectively for so governing the said transmission elements as to cause the said spools to be respectively rotated at speeds varying inversely to the quantities of said flexible material carried thereon and relative to the speed of the said transmission elements.

5. In tape winding mechanism, the combination of two spools, flexible material adapted to be wound from one of said spools to the other of said spools, a rotatable driving member, transmission members driven by said rotatable driving member and adapted to transmit rotary motion independently of said flexible material from said rotatable driving member to each of said spools respectively, and means controlled by the quantities of said flexible material carried by each of said spools respectively for automatically so adjusting the said transmission members as to cause the said spools to be respectively rotated by the said transmission members at such varying ratios of speed with respect to each other and to the said rotatable driving member that equal lengths of said flexible material are unwound from one of said spools during each rotation of said rotatable driving member and wound upon the other of said spools during the same rotation of the said rotatable driving member.

6. In tape winding mechanism, the combination of two rotatable spools adapted to carry flexible material thereon, a rotatable member, two friction wheels positively driven in unison by said rotatable member and adapted to engage with and transmit rotary motion directly to each of said spools respectively, and automatic means for so varying the positions of the said friction wheels with respect to the axes of the said spools respectively as to cause one of said spools to unwind equal lengths of said flexible material and the other of said spools to wind upon itself equal lengths of said flexible material during each rotation of the said rotatable member.

7. In tape winding mechanism, the combination of two spools, two friction members frictionally engaging the said spools directly and respectively, and means controlled by the thicknesses of material wound upon each of said spools respectively for varying the distances from the axes of the said spools of the points of frictional engagement of the said friction members with the said spools respectively.

8. In tape winding mechanism, the combination of two spools, a rotatable member, and automatic means for transmitting rotary motion from the said rotatable member directly to each of said spools at such constantly varying rates of speed in relation to each other as to cause a constant rate of movement of any flexible material that may be winding from one of said spools to the other of said spools.

9. In tape winding mechanism, the combination of two spools, a flexible tape adapted to be wound from one of said spools and upon the other of said spools, a rotatable driving member, transmission members adapted to transmit rotary motion from the said rotatable driving member independently of the said flexible tape to each of the said spools respectively, and automatic means for so varying with respect to each other and to the said rotatable driving member the rotary speeds transmitted to the said spools through the said transmission members as to cause the rate of movement of the said flexible tape from one of said spools to the other of said spools to bear a fixed ratio to the speed of rotation of the said rotatable driving member.

10. In tape winding mechanism, the combination of two spools adapted to have flexible material wound thereon, elements held in contact with the outermost convolution of flexible material upon each of said spools, a telescopic and rotatable shaft carrying two friction wheels fixed thereto, connections between said elements and said telescopic and rotatable shaft whereby said shaft is telescopically actuated by said elements, friction disks forming parts of each of said spools and adapted to be pressed into frictional engagement with said friction wheels, resilient means for pressing said friction disks against said friction wheels, and means for imparting rotary motion to said rotatable and telescopic shaft.

11. In tape winding mechanism, the combination of a supply spool, a receiving spool, friction disks carried by each of said spools, friction wheels respectively engaging each of said friction disks and independently movable radially of said friction disks, a hollow shaft having one of the said friction wheels fixed thereon for rotation therewith, a solid shaft adapted to partially telescope within the said hollow shaft and having the other of said friction wheels fixed thereon for rotation therewith, means locking the said shafts together for rotation in unison, means for rotating the said shafts, and means controlled by the quantity of material upon each of said spools respectively for automatically so positioning the friction wheels respectively engaging each of the said friction disks radially of said disks as to cause a like length of material to be unwound from the said supply spool and to be wound upon the said receiving spool at each rotation of the said friction wheels.

12. In tape winding mechanism, the combination of two spools adapted to carry flexible tape wound thereon, a movable member adapted to impart rotary motion to each of said spools independently of said flexible tape, and automatic means controlled by the quantities of flexible tape wound upon each of said spools for so regulating the degrees of rotary motion imparted to each of said spools respectively by a given degree of movement of the said movable member as to wind like lengths of said tape in like times from one of said spools and upon the other of said spools without tensioning the said tape.

13. In tape winding mechanism, the combination of two rotatable spools, a flexible tape adapted to be wound from one of said spools to the other of said spools and to have a given degree of slack therein in its passage between the said spools, a rotatable member adapted to transmit, independently of said flexible tape, rotary motion to each of said spools, automatic means adapted to cause one of said spools to unwind from itself equal lengths of said flexible tape during each rotation of said rotatable member, and automatic means adapted to cause the other of said spools to wind upon itself during each rotation of the said rotatable member lengths of said flexible tape equal to the lengths of said flexible tape unwound from the unwinding spool during each rotation of the said rotatable member.

14. In tape winding mechanism, the combination of a supply spool, a receiving spool, a flexible tape adapted to be wound from the said supply spool to the said receiving spool, driving means operating independently of said flexible take and adapted to rotate the said spools, and automatic means for so controlling the speeds of the said spools relative to each other and to the said driving means as to cause progressive increase in the speed of the said supply spool and progressive decrease in the speed of the said receiving spool in inverse proportion to the quantities of said tape carried by each of said spools.

CHARLES H. GILL.